United States Patent [19]

Meador

[11] 4,451,789
[45] May 29, 1984

[54] LOGGING TOOL AND METHOD FOR MEASURING RESISTIVITY OF DIFFERENT RADIAL ZONES AT A COMMON DEPTH OF MEASUREMENT

[75] Inventor: Richard A. Meador, Spring, Tex.

[73] Assignee: NL Industries, Inc., New York, N.Y.

[21] Appl. No.: 306,209

[22] Filed: Sep. 28, 1981

[51] Int. Cl.³ .............................................. G01V 3/30
[52] U.S. Cl. ..................................... 324/338; 324/335
[58] Field of Search .......................... 324/335, 338–341

[56] References Cited

U.S. PATENT DOCUMENTS

| | | | |
|---|---|---|---|
| 2,790,138 | 4/1957 | Poupon | 324/339 |
| 3,259,837 | 7/1966 | Oshry | 324/339 |
| 3,551,797 | 12/1970 | Gouilloud et al. | 324/338 |
| 4,107,597 | 8/1978 | Meador et al. | 324/339 X |
| 4,300,098 | 11/1981 | Huchital et al. | 324/338 |

Primary Examiner—Gerard R. Strecker

Attorney, Agent, or Firm—Browning, Bushman, Zamecki & Anderson

[57] ABSTRACT

A wireline logging system for measuring formation resistivity includes a longitudinal housing having three transmitters and three receivers arranged at measured distances on the housing, with about four feet between the outermost ends of the array. The transmitters are operated at three different frequencies, with each receiver receiving all three frequencies. The output of each receiver is the three received frequencies, which is amplified and fed to a mixer. A local oscillator frequency is also fed to each mixer. The output from each mixer of the three received frequencies mixed with a local frequency is passed through a filter to output one of the three received signals at a lower frequency. The frequency mix is arranged so that the output of each of the filters is at a common frequency. The filtered outputs from pairs of the filters are then passed to phase comparators and/or amplitude ratio determining devices to provide signals indicative of formation resistivity which are then passed to the surface on the wireline.

15 Claims, 2 Drawing Figures

LOGGING TOOL AND METHOD FOR MEASURING RESISTIVITY OF DIFFERENT RADIAL ZONES AT A COMMON DEPTH OF MEASUREMENT

BACKGROUND OF THE INVENTION

The present invention relates to a method and apparatus for logging boreholes and more particularly to a wireline logging system utilizing electromagnetic wave propagation to measure formation parameters.

It is well known to log or record certain electrical characteristics of earth formations surrounding a well borehole as a function of depth in order to determine the location and extent of oil-bearing strata. A log of formation resistivity versus depth may indicate the presence of hydrocarbons, since hydrocarbon-bearing formations typically exhibit a higher resistivity than formations containing mostly salt water. There are only three material parameters which affect an electromagnetic wave, whether the wave gets from one point to another by induction or by propagation. They are conductivity (resistivity), magnetic susceptibility and dielectric constant. Conductivity provides an indication of the energy absorbing characteristics of the medium, while magnetic susceptibility and dielectric constant give a measure of the energy storing capacity of a material. The magnetic susceptibility of most earth materials has relatively little effect on electromagnetic waves and is of very little use in electrical logging techniques. Dielectric constant has considerable variation in the earth and has a large influence on high-frequency propagation but very little influence at low frequencies. It is well known that conductivity or resistivity has wide variation in value for earth materials and strongly affects all electromagnetic waves.

A propagating electromagnetic wave has two fundamental characteristics, amplitude and phase. By comparing the amplitude and phase of an electromagnetic wave as it passes receivers, propagation characteristics due to formation may be studied. Measurement of these two characteristics in terms of wave travel time and attenuation may be used to determine the dielectric constant and/or resistivity of the media through which the wave is propagated.

Study has indicated that four general frequency ranges exist which allow measurement of the formation effects. These four frequency regions are induction, low radio frequency propagation, high radio frequency propagation, and ultra high radio frequency propagation.

Resistivity is the only parameter that materially influences the measurements in the induction and low radio frequency propagation range. The resistivity and dielectric constant have about the same magnitude of influence in the high radio frequency propagation region. In the ultra high radio frequency region, the dielectric constant dominates the wave travel time while the resistivity influences wave attenuation.

Electrical induction logging has been practiced for many years. In conventional induction logging, a well logging sonde is provided having a transmitter coil (or array of coils) and a receiver coil (or array of coils) at longitudinally spaced intervals from the receiver coil. Usually, an alternating current, in a range of 20 to 50 kilohertz, is passed through the transmitter coil. The resulting electric fields produced by this alternating current in the earth formation surrounding a well bore are detected at a spaced receiver coil by sensing the induced current or voltage in the receiver coil. Induction logging has been principally used with oil-base drilling mud or drilling fluids having high resistivities but, in recent years, has come to be used even with highly conductive (low resistivity) drilling fluids.

In low radio frequency wave propagation, both the travel time and attenuation are affected essentially by the formation resistivity, and measurements of these propagation parameters in low radio frequency regions yields essentially resistivity information.

For example, in U.S. Pat. No. 3,551,797 to Gouilloud et al., there is disclosed a technique wherein electromagnetic energy is transmitted into the formations and energy shed back into the borehole is measured at two spaced receivers to determine the relative attenuation and/or the relative phase of the electromagnetic energy propagating in the formations. Gouilloud et al teaches that by using different transmitter-to-receiver spacings, different depths of investigation into the borehole can be attained. For example, a relatively closer spaced receiver pair can be utilized to obtain attenuation and/or phase information from which properties of the invaded zone are determined and measurements of attenuation and/or phase from a relatively further spaced pair of receivers can be utilized to obtain the properties of the deeper uninvaded formations. In the patent of Gouilloud et al, the concern is largely with obtaining conductivity. Either attenuation or phase can be utilized therein to determine the skin depth of the formations, with conductivity then being determinable from the skin depth. Below a certain frequency range, the skin depth of the electromagnetic energy can be calculated using either attenuation or phase information since displacement currents have minimal effect.

As described above, the depth of investigation of a particular logging device, at a given frequency, is generally understood to be determined by transmitter-to-receiver spacings. At least two types of basic considerations pertaining to depth of investigation are evident in the prior art. First, when it is desired to obtain values of formation characteristics such as conductivity or dielectric constant, different spacings can be intentionally used to determine these characteristics at different depths of investigation (as discussed briefly above). For example, a relatively short spacing logging device can be used to measure formation characteristics in the invaded zone and a relatively long spacing logging device can be used to measure formation characteristics in the noninvaded zone. Secondly, in some techniques measured values are, of necessity, indicative of readings at different depths of investigation, such as where different logging devices are employed to obtain different formation characteristics that are utilized together in formation evaluation. When the measured values are combined to yield formation characteristics, the different depths of investigation are considered as introducing error. This would appear to follow logically since some of the readings used to evaluate formations may be coming from one depth of investigation where the formations might be of a different nature.

U.S. Pat. No. 4,107,597 describes a system for determining wave propagation characteristics of a formation by comparing amplitude and phase of propagated waves as received at spaced receivers. One drawback of this system however is the problem mentioned above relative to information being derived from different depths. The final presentation of such a log analysis perferably relates data concerning varying lateral depths of investigation, i.e. invaded and noninvaded zones, to a common vertical depth. With the apparatus of U.S. Pat. No. 4,107,597 this depth correlation must be performed by delaying readings between logging points using a memorizer.

A commonly used device for obtaining the formation information which is the subject of the present invention, is the dual induction logging tool. This tool utilizes on the order of ten coils wrapped on a mandrel which is well over ten feet long. In addition shallow measurements in the invaded zone are made with electrode logging techniques which utilize an electric field in the surrounding formation to measure the conductivity thereof and requires a conductive mud for its use. This obviates the use of the system in oil base muds. The long coil array in a dual induction log also provides a problem relative to the measuring point, as discussed above, being at varying vertical depths for each lateral depth of investigation. Also, the measuring point on a deep induction tool may typically be 5 or 6 feet from the bottom of the tool; thus no investigating is possible in the bottom 5 or 6 feet of the hole.

It is therefore an object of the present invention to provide a new and improved formation logging system for measuring formation parameters from different lateral zones at a common vertical depth and close to the bottom of a borehole, with such system being simple in construction and operation.

SUMMARY OF THE INVENTION

With this and other objects in view the present invention contemplates a method and apparatus for investigating earth formations in the vicinity of a borehole and utilizing electromagnetic wave propagation techniques. A plurality of transmitters are mounted on a sonde and are operated at varying frequencies.

At least three receivers are mounted on the sonde, spaced from one another and the transmitters at measured distances. Each receiver receives the plurality of transmitted frequencies, which vary only slightly in frequency, and passes the frequencies to a mixer also receives a local oscillator frequency. A filter filters the output of each mixer to output a signal corresponding to one of the received frequencies, with such signal from each mixer being at a common frequency, which is in a lower that is compatible with typical electrical circuitry processing. Outputs from the filters corresponding to the same transmitter are compared to provide information indicative of formation parameters.

DESCRIPTION OF THE PREFERRED EMBODIMENTS

Figure 1:
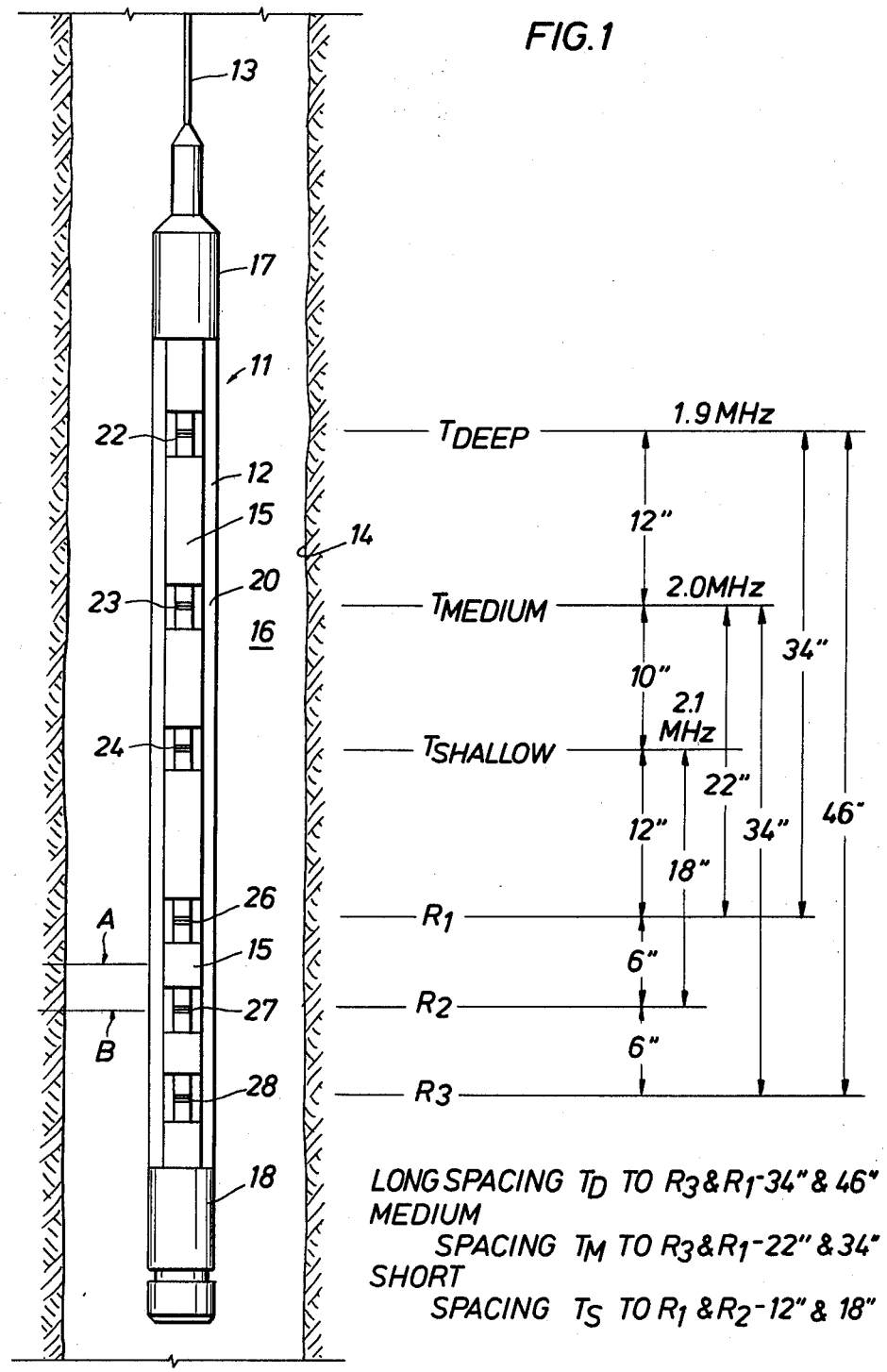
FIG. 1 is a schematic view of a well tool in accordance with the present invention and a chart associated therewith showing transmitter and receiver spacing, together with measuring points for investigations of varying lateral depths.

Referring now to FIG. 1 of the drawings, a logging system utilizing concepts of the present invention includes a well logging sonde 11 made up of a cylindrical housing 12 for encasing a coil array and associated electronics. The housing 12 is made up as a pressure-tight case formed of a non-conducting material such as fiberglass. The sonde 11 is shown suspended by a well logging cable 13 in an uncased well borehole 14, normally filled with a fluid such as a drilling fluid. The borehole 14 is surrounded by earth formations whose conductivity or other such parameters, are to be measured.

Top and bottom portions 17 and 18 respectively of the sonde housing 12 comprise electronic sections associated with transmitting and receiving coils 22 through 24 and 26 through 28, respectively. The transmitting and receiving coils are made identical and in the present configuration are wound on a machinable ceramic core which has a near zero coefficient of expansion relative to temperature differentials. Each coil has a diameter of approximately three fourths of an inch and is positioned within a split conductive cylinder forming an electrostatic shield. The coil is approximately one inch long, with the shield being two and one half inches in length. Epoxy glass spacers 15 are arranged between the coils, and the entire assembly is wrapped in epoxy glass 20 of sufficient thickness to provide strength and pressure characteristics to the housing 12 that are compatible with its use in a borehole environment. The transmitting and receiving coils are arranged along the center axis of the sonde in a vertical spaced relationship of measured distances as illustrated by the dimensional chart forming a part of FIG. 1.

The transmitter and receiver coil spacings shown in FIG. 1 represent a particular scheme which is useful in practicing the concepts of the present invention, but they are intended as being illustrative only. It may be readily seen that other than the disclosed spacings between transmitter and receiver coils or a different number of coils may be utilized without departing from the intended scope of the invention.

As is well known in such logging systems, the radial depth of investigation is dependent on the spacing between pairs of receiver coils and also the spacing between the receiver coils and the associated transmitter coils. The radial depth of investigation for pairs of receiver coils increases with the distance that such pair of coils is spaced from a corresponding transmitter. The measuring points represented by the imaginary horizontal lines A and B which extend radially outwardly into the formation, represent the vertical level at which the radial investigation is taking place. It is readily seen that when information is gathered as to formation conductivity, for example, at various radial depths, i.e., shallow, medium and deep, it is helpful to relate the variable radial depth readings to a common vertical level. The line "A" in FIG. 1 corresponds to the shallow measuring point and the line "B" corresponds to the measuring point for medium and deep radial depths of investigation. These measuring points are calculated to be midway between the pairs of receivers from which the information is being derived. For example, the shallow reading in the system of FIG. 1 is being derived from data emanating from receivers 26 and 27 or R1 and R2, respectively. Line "A" represents the midpoint between receivers 26 and 27. As discussed in the Gouilloud et al U.S. Pat. No. 3,551,797, this derivation of the measuring point may be oversimplified but suffices to explain the working of the system. Gouilloud suggests that the zone of investigation may be somewhat asymmetrical with respect to the midline between pairs of receivers as is discussed relative to FIG. 3 of the Gouilloud patent. In any event, the important features are that the measuring points of the various radial depths of investigation be as closely related as possible to a common vertical depth, and that, such measuring points are related to the spacing of the receiver pair from which the data is being derived. The present system of transmitter and receiver coil spacings will be discussed in greater detail with respect to the overall operation of the system but again briefly stated, the depth of radial investigation depends on transmitter to receiver spacing and the measuring point depends on the spacing between receiver pairs from which the data is being derived.

In the illustrated scheme of transmitters and receivers, the radially shallow investigation, i.e. into the invaded zone, is derived from receivers 1 and 2 in conjunction with the transmitter labeled shallow ($T_S$) or transmitter 24. Transmitter 24 is spaced twelve inches from receiver 26 ($R_1$) and eighteen inches from receiver 27 ($R_2$). Thus the receivers $R_1$ and $R_2$ are spaced six inches from one another and the measuring point "A" is midway between the receivers $R_1$ and $R_2$.

Figure 2:
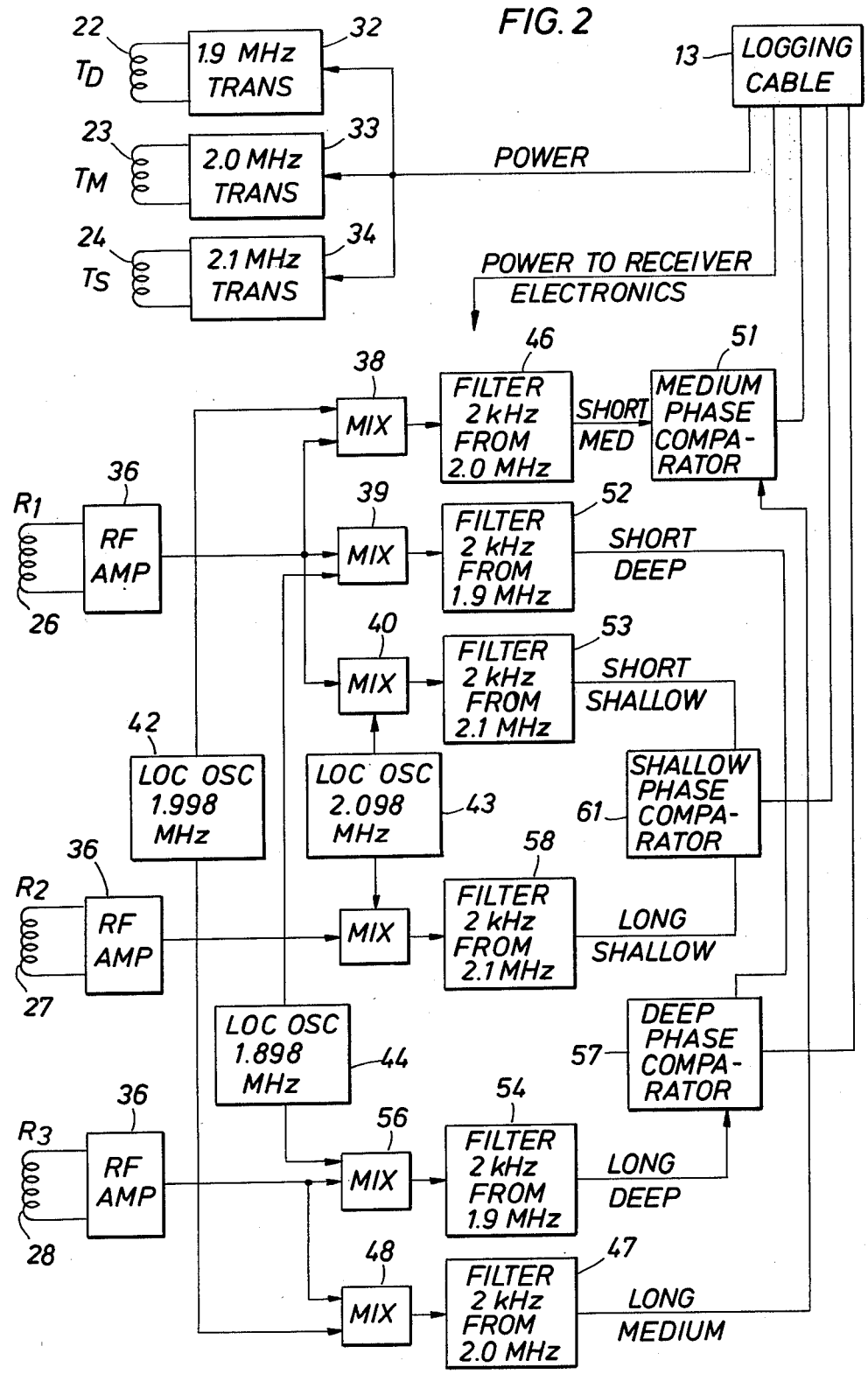
FIG. 2 shows a block circuit diagram of circuitry including the transmitters and receivers, in accordance with the present invention.

Next referring to FIG. 2 of the drawings, a block circuit diagram shows the electronic scheme associated with the transmitter-receiver array in accordance with the present invention. Transmitter coils 22, 23 and 24 are shown connected to signal generators 32, 33 and 34, respectively. Transmitter 22 is operated at a frequency of 1.9 MHz and in the illustrated scheme, is utilized for radially deep formation investigation. Since it is the uppermost transmitter in the array, its spacing from the lowermost receiver is the longest in the array and thereby provides the deepest signal penetration into surrounding formations.

Transmitter 23 which is arranged twelve inches below transmitter 22 (see FIG. 1) is operated by signal generator 33 at 2.0 MHz and serves as the transmitter for medium depths of investigation, i.e., to determine the diameter of the invaded zone.

Transmitter 24 is positioned ten inches below transmitter 23 and is operated at 2.1 MHz by signal generator 34. Transmitter 24 which is most closely spaced from the receivers, serves as the transmitter for shallow radial investigation, i.e., into the invaded zone of the formation.

Next referring to the receiver circuits of FIG. 2, receiver 26 ($R_1$) is spaced uppermost in the receiver array and twelve inches from the lowermost transmitter 24 ($T_S$). Receiver 27 ($R_2$) is positioned six inches below $R_1$ and eighteen inches below $T_S$.

The coil of each receiver is coupled to a RF amplifier 36, which amplifies the received signals and passes them to one or more mixers. In the illustrated scheme, the output of R1 is passed to three mixers 38, 39 and 40. It is to be remembered that each receiver coil receives each of the three transmitted frequencies, i.e. 1.9 MHz, 2.0 MHz and 2.1 MHz. These three received frequencies are then amplified at 36 and passed to mixers 38, 39 and 40, as well as to the other mixers associated with other receivers. Another input to each of the mixers is from a local oscillator. Mixer 38 receives a frequency of 1.998 MHz from local oscillator 42. This in turn is mixed with the three incoming frequencies received from $R_1$. The output of mixer 38 is passed to a 2 KHz filter 46 which only passes a 2 KHz signal. Since a 2 KHz difference only exists between intermediate frequency 1.998 MHz and the 2.0 MHz received signal from transmitter 23 ($T_M$), the output of filter 46 gives a signal derived from transmitter 23 ($T_M$) and receiver 26 ($R_1$). As seen in FIG. 1, this datum signal is one of the data inputs for the medium depth of investigation, i.e., relating to the diameter of the invaded zone.

In a like manner, the other data signals for deriving phase change characteristics, for example, of the signal in the medium depth of investigation, is taken from filter 47. The derivation of the signal from filter 47 is as follows: the three transmitted frequencies are received by receiver coil 28 ($R_3$), amplified at corresponding RF amplifier 36 and passed to mixer 48. The local oscillator frequency 1.998 MHz is also passed from local oscillator 42 to mixer 48 to mix with the three incoming received frequencies. The output of mixer 48 is passed through 2 KHz filter 47 which thus passes only the received 2.0 MHz transmitted frequency from transmitter coil 23 ($T_M$). The outputs from each of the filters 46 and 47 is passed to a phase comparator 51 which detects the time delay between the signals received at $R_1$ and $R_3$ at 2.0 MHz. This information is then passed to the surface by means of the logging cable or recorded to provide data to determine formation parameters related to the signal phase comparison. This data processing technique is discussed in greater detail in U.S. Pat. No. 4,107,597 to Meador et al and Gouilloud et at, U.S. Pat. No. 3,551,797.

Receiver 26 ($R_1$) also outputs to mixers 39 and 40 which provide signal inputs to filters 52 and 53, respectively, to furnish the short distance data input for the shallow and deep investigations. The frequency for the deep formation data is derived from local oscillator 44, operating at 1.898 MHz. two KHz filter 52 outputs a signal derived from the 1.9 MHz transmitter 22, 2 KHz being the mixed difference between the transmitted 1.9 MHz and the 1.898 MHz local oscillator frequency. The signal from filter 52 gives the short spaced receiver signal for the deep formation data. The long spaced receiver signal for the deep formation data comes from filter 54. Filter 54 receives the output of mixer 56 which mixes the local oscillator 44 output at 1.898 MHz with the incoming transmitted frequencies. The filter 54 thus passes a 2 KHz signal derived from the 1.9 MHz transmitted frequency received at the lowermost receiver 28 ($R_3$). The output of filter 54 is passed together with the output from filter 52 to a phase comparator 57 to provide an output signal indicative of the phase delay of a signal transmitted from the top transmitter to the top and bottom receivers R1 and R3 at 1.9 MHz.

In a like manner local oscillator 43 provides a frequency of 2.098 MHz which when mixed with the incoming frequencies and filtered by a 2 KHz filter provides an output from filters 53 and 58. The output of filters 53 and 58 is derived from the 2.1 MHz transmitted frequency supplied by the lowermost transmitter 24 to the top and middle receivers $R_1$ and $R_2$, respectively, and thus provides information concerning shallow formation depth at a measuring point corresponding to line A in FIG. 1.

In this respect it is seen that the measuring point for both the long and medium depths of formation investigation occurs at line B since receivers $R_1$ and $R_3$ are used for both of these depths with only the transmitter distance being different, i.e., the deep formation data utilizes transmitter 22 and the medium formation data utilizes transmitter 23. The measuring point lines "A" and "B" are spaced only three inches from one another which is sufficient for purposes of resistivity logging data to satisfy the need of deriving data for the three zones of radial investigation at a common vertical depth. The output of filters 53 and 58 is passed to a shallow phase comparator 61 which compares the time delay of the 2.1 MHz signal from lowermost transmitter 24 as received at the top and middle receivers 26 and 27, respectively.

Although not shown in the circuit diagram, amplitude comparisons of the signals from the same transmitters may be compared from different receivers to provide data indicative of formation resistivity.

The three transmitters are operated at very close frequencies in order to avoid problems with the dispersiveness of formation parameters such as resistivity with respect to changing frequencies in this range of frequencies. Thus the illustrative frequencies vary totally by only about 10 percent.

While particular embodiments of the present invention have been shown and described, it is apparent that changes and modifications may be made. For example, while the present invention disclosure has been described primarily with respect to resistivity measurements derived from signal phase comparison at particular frequencies, it is apparent that other measurements derived from other parameters and at other frequencies may be accomplished without departing from this invention in its broadest aspects and therefore the aim in the appended claims is to cover such changes and modifications as fall within the true spirit and scope of this invention.

I claim:

1. A method for measuring parameters in the environment of a borehole by passing into the wellbore an elongated housing having a plurality of transmitters spaced longitudinally along the axis of said housing and a plurality of receiver pairs spaced longitudinally along the axis of said housing at measured distances from said transmitters, comprising the steps of:
   generating a signal of sufficient frequency at each transmitter to effectively propagate through the surrounding environment, said signals being of a different frequency from each transmitter;
   receiving the signal from each transmitter at each receiver;
   generating a plurality of local frequencies in the housing, each local frequency corresponding to a transmitter frequency;
   directing the received signals from each receiver of each receiver pair into a plurality of separate mixers, each receiver having associated therewith one or more said mixers;
   mixing one of the local frequencies with the incoming transmitted frequencies at each mixer; and
   filtering the output of the mixed frequencies to provide a common output frequency from each of the mixers, which common output frequency is derived from separate ones of the received frequencies.

2. The method of claim 1 and further including transmitting frequencies from the different transmitters which vary by less than fifteen percent frequency difference.

3. The method of claim 1 wherein said common output frequency is at a frequency lower than that necessary to effectively propagate through a formation and compatible with data processing circuits and wireline transmission.

4. The method of claim 1 wherein said transmitted frequencies are in the range of 500 KHz to 10 Mhz.

5. The method of claim 1 and further including comparing the filtered output from pairs of receivers and determining from the compared filtered outputs, the phase difference of the received signals.

6. The method of claim 5 and further including determining the amplitude ratio of the filtered output from pairs of the receivers.

7. Apparatus for measuring parameters in the environment surrounding a borehole, including an elongated housing for passing into the borehole, comprising:
   a plurality of transmitting means mounted in a spaced longitudinal configuration on said housing;
   means for operating each of said transmitting means at a different frequency;
   a plurality of pairs of receiving means spaced a measured distance from said transmitting means and arranged in a spaced longitudinal configuration on said housing;
   local frequency generating means for generating a plurality of local frequencies, each local frequency corresponding to a transmitting frequency;
   a plurality of separate mixing means associated with each receiver of said receiving pair means for separately mixing one or more of the frequencies received at each receiving means with a different local frequency; and
   separate filter means associated with each of said mixing means for receiving the output of the mixing means and outputing a signal derived from one of the transmitting means and at a frequency common to the output of each of the separate filter means.

8. The apparatus of claim 7 and further including means for comparing the phase of output signals from pairs of said separate filter means so that a common depth point is provided for each of said pairs.

9. The apparatus of claim 7 wherein said transmitting means are arranged to operate at different frequencies varying no more than 15% of frequency from one another.

10. The apparatus of claim 7 wherein said plurality of transmitting means includes at least three transmitters and said plurality of receiving means includes at least three receivers.

11. The apparatus of claim 9 wherein said different frequencies are all in the range of 500 KHz to 10 MHz.

12. The apparatus of claim 8 and further including means for comparing the amplitude ratio between the output signals of pairs of said separate filter means.

13. A method for investigating characteristics of the environment of a borehole by passing an elongated housing into the borehole, such housing having a plurality of transmitters spaced longitudinally along the axis of the housing and a plurality of receivers spaced longitudinally along the housing at a measured distance for such transmitters, to provide different radial zones of investigation, which method includes the steps of:
   generating a signal of sufficient frequency at each transmitter to effectively propagate through the surrounding environment, such signal being of a different frequency from each transmitter;
   receiving the signal from each transmitter at each receiver;
   generating a plurality of local frequencies for mixing with the signals from each receiver, each local frequency corresponding to a transmitter frequency;

mixing the local frequencies with the incoming transmitted frequencies at each receiver;

outputting each mixed frequency from each receiver as an output frequency; and for one or more pairs of receivers, comparing separately for each transmitter frequency, the output frequency of the first receiver of each pair with the output frequency of the second receiver of each pair, said output frequencies of each comparison derived from the same transmitter frequency.

14. The method of claim 13 and further including filtering the output of the mixed frequencies to provide a common output frequency and comparing such common output frequency.

15. A method for measuring parameters in the environment of a borehole by passing into the wellbore an elongated housing having a plurality of transmitters spaced longitudinally along the axis of said housing and a pair of receivers spaced longitudinally along the axis of said housing in measured distances from said transmitters, comprising the steps of:

generating a signal of sufficient frequency at each transmitter to effectively propagate through the surrounding environment, said signals being of a different frequency from each transmitter;

receiving the signals from each transmitter at each receiver;

generating a plurality of local frequencies in said housing, each local frequency corresponding to a transmitter frequency;

directing the received signals from each receiver into a plurality of separate mixers, each receiver having associated therewith one or more said mixers;

mixing one of the local frequencies with incoming transmitter frequencies at each mixer, the local frequency being different for each mixer associated with a given receiver; and filtering the output of the mixed frequencies to provide a common output frequency from each of the mixers, which output frequency is derived from separate ones of the received frequencies.

* * * * *

UNITED STATES PATENT AND TRADEMARK OFFICE
CERTIFICATE OF CORRECTION

PATENT NO. : 4,451,789
DATED : May 29, 1984
INVENTOR(S) : Richard A. Meador

It is certified that error appears in the above—identified patent and that said Letters Patent is hereby corrected as shown below:

In Column 8, line 55, delete "for" and insert therefor --from--.

Signed and Sealed this

Eighteenth Day of December 1984

[SEAL]

Attest:

GERALD J. MOSSINGHOFF

Attesting Officer

Commissioner of Patents and Trademarks